March 25, 1941.  C. J. KOTCHI ET AL  2,236,372
HOLDER FOR ELECTRIC WELDING ELECTRODES
Filed May 20, 1940
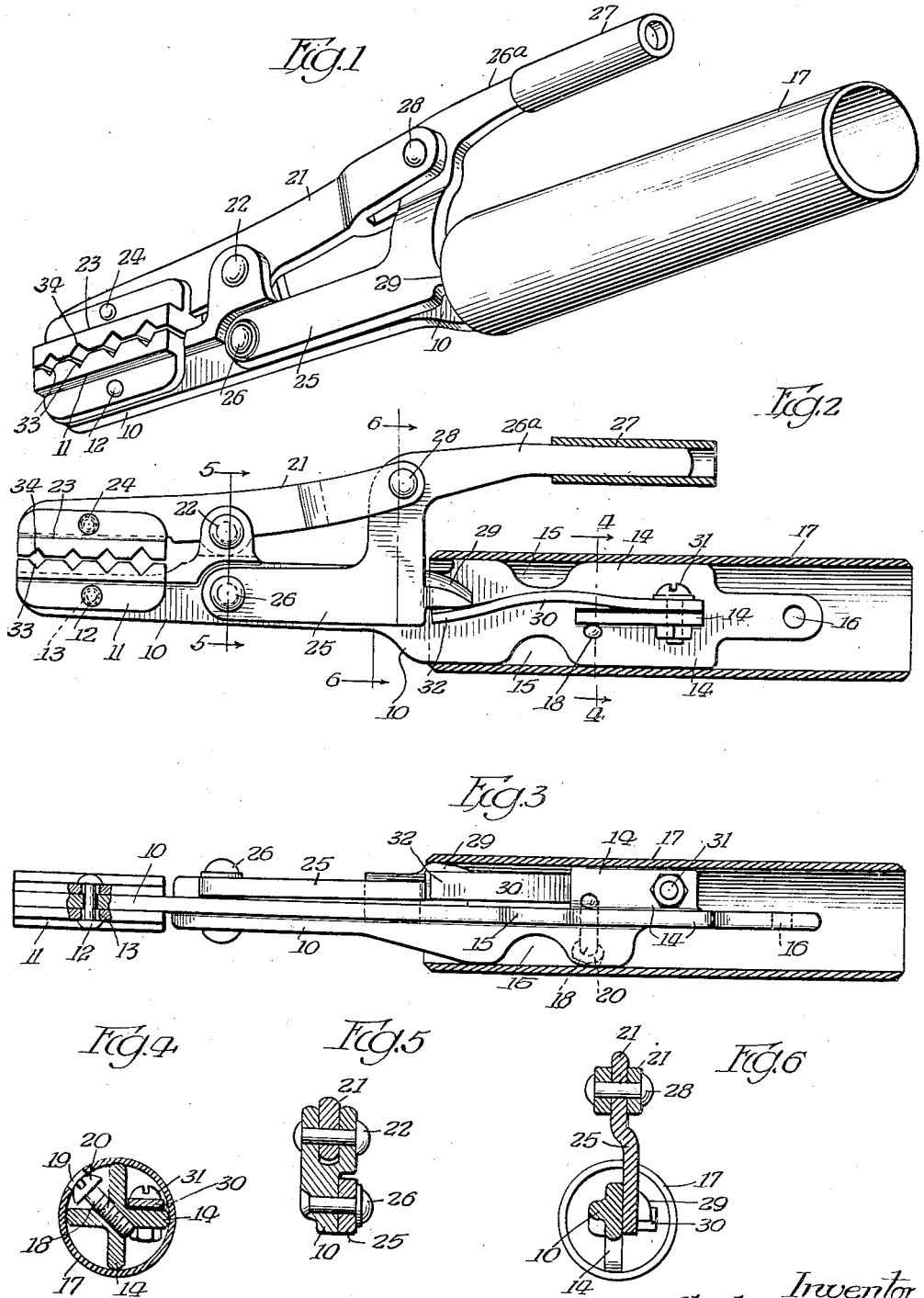
Inventor
Charles L. Kotchi
Joseph Ponde lick Patented Mar. 25, 1941

2,236,372

UNITED STATES PATENT OFFICE 2,236,372

HOLDER FOR ELECTRIC WELDING ELECTRODES

Charles J. Kotchi and Joseph Pondelick, Chicago, Ill.

Application May 20, 1940, Serial No. 336,228

6 Claims. (Cl. 219—8)

This invention relates to holders particularly adapted though not necessarily limited in use for holding electrodes, rods or wire employed in arc welding, and one of the objects of the invention is to provide an improved holder of this character which will be simple and compact in construction and adapted for ease in manipulation, and in which device the electrode or wire will be firmly held or clamped without the use of screws or springs for clamping the wire.

A further object is to provide an improved device of this character in which the wire will be gripped and held by jaws pivotally mounted upon the implement whereby the jaws will conform to the shape or contour of the wire.

A further object is to provide improved means for cooling the handle of the implement and improved means for removably securing the handle in position upon the tool.

A further object is to provide in a device of this character improved spring means for operating one of the jaws and which spring will be housed within the handle of the implement.

A further object is to provide an improved construction and arrangement of parts whereby the leverage of one of the jaws will be greatly increased.

To the attainment of these ends and the accomplishment of other new and useful objects as will appear, the invention consists in the features of novelty in substantially the construction, combination and arrangement of the several parts hereinafter more fully described and claimed and shown in the accompanying drawing illustrating this invention, and in which Figure 1 is a perspective view of a holder of this character constructed in accordance with the principles of this invention.

Figure 2 is a lonigtudinal sectional view of Figure 1.

Figure 3 is a top plan view of Figure 1 partly in longitudinal section.

Figure 4 is a detail sectional view taken on line 4—4 Figure 2.

Figure 5 is a detail sectional view taken on line 5—5 Figure 2.

Figure 6 is a detail sectional view taken on line 6—6 Figure 2.

The tool consists essentially of a handle 10. A jaw 11 is pivotally mounted, as at 12, upon one end of the handle and the pivot is preferably formed by means of a pin connected with the handle and which pin extends into apertures 13 in the jaw, the latter being bifurcated to stand astride of the handle, the pivotal connection permitting the jaw 11 to move with respect to the handle 10 on axes transverse to each other. The other end of the handle is shaped to form spaced ribs 14 and these ribs may be cut away, as at 15, while the extremity of the handle is provided with an opening 16 to which an electrical conductor may be connected.

The numeral 17 designates a tubular casing of any desired or suitable heat insulating material. This casing is open at both ends and is adapted to be telescoped or sleeved over the handle and ribs 14, and the ribs together with the cut away portions 15 of the handle form air passages whereby air may circulate through the casing 17 and about the encased end of the handle.

Any suitable means may be provided for retaining the casing 17 in position, such for instance as a screw 18, which is threaded into the handle, and the casing 17 is provided with an opening 19 through the wall thereof in alinement with the screw. The screw is adapted to be adjusted by means of an implement inserted into the opening 19 of the casing, and the end 20 of the screw is of a diameter greater than the diameter of the opening 19, so that the screw may be backed out of the handle to cause the head or end 20 thereof to contact the inner face of the casing 17 and thereby secure the casing against accidental displacement from the handle.

Pivotally mounted upon the handle 10 and in advance of the end of the casing 17 is a lever 21, the point of pivotal connection 22 being disposed between the ends of the lever. A jaw 23 is connected to one end of the lever 21 by means of a pivot 24, this pivot being preferably of a construction similar to the pivot 12 and 13, thereby adapting the jaw 23 for movement with the lever 21 when the latter is moved about the pivot 22, and also for movements with respect to the lever on axes transverse to each other.

A bell crank lever 25 is pivotally mounted at one end, as at 26, upon the handle 10 and the pivot 26 may be disposed in any position with respect to the length of the handle but preferably in proximity to the pivot 22. The free end of the bell crank lever 25 is shaped to form a handle 25a upon which may be sleeved a suitable heat insulating casing 27.

The free end of the lever 21 is pivotally connected, as at 28, to the bell crank lever 25 so that when the latter is moved about its pivot 26 the lever 21 will be rocked about its pivot and the jaw 23 will be moved toward or away from the jaw 11.

The bell crank lever 25 is provided with a lip or extension 29 that projects into the end of the casing 17 and secured to the portion of the handle that is within the casing is a spring 30 which is preferably anchored by one end, as at 31, to one of the ribs 14. The free end 32 of the spring 30 contacts the ear or projection 29 on the bell crank lever 25 and tends normally to move the lever 25 in a direction to cause the jaw 23 to be moved toward the jaw 11 so as to clamp and hold the welding rod or wire.

If desired, the jaw 11 may be provided with seats or recesses 33 while the jaw 23 may be provided with seats or recesses 34 for receiving and holding the wire.

With this improved construction it will be manifest that the parts are so constructed and arranged that a considerable leverage will be obtained upon the jaw 23 by reason of the bell crank lever 25. Furthermore, the spring 30 acting upon the projection 29 on the bell crank lever 25 will cause the jaws to firmly grip the welding rod or wire.

With this construction it will also be manifest that the handle will not only be heat insulated by the casing 17 but the spring 30 will be housed entirely within the casing and this spring together with its point of contact with the projection or extension 29 on the bell crank lever 25 are also housed and protected by the casing 17.

While the preferred form of the invention has been herein shown and described, it is to be understood that various changes may be made in the details of construction and in the combination and arrangement of the several parts, within the scope of the claims, without departing from the spirit of this invention.

What is claimed as new is:

1. A holder of the character described including a handle, a jaw carried by one end of the handle, a lever pivotally mounted intermediate its ends upon said handle, one end of the lever terminating adjacent said jaw, a jaw carried by said end of the lever, a bell crank lever pivotally mounted by one end upon said handle, the first said lever being pivotally connected by one end with said bell crank lever intermediate the ends of the latter, and a spring acting on said bell crank lever and tending normally to move said jaws toward each other, one end of said bell crank lever constituting a handle which co-operates with the first said handle whereby the said jaws may be separated.

2. A holder of the character described including a handle, a jaw carried by one end of the handle, a lever pivotally mounted intermediate its ends upon said handle, one end of the lever terminating adjacent said jaw, a jaw carried by said end of the lever, a bell crank lever pivotally mounted by one end upon said handle, the first said lever being pivotally connected by one end with said bell crank lever intermediate the ends of the latter, a leaf spring anchored by one end and acting on said bell crank lever and tending normally to move said jaws towards each other, the free end of said bell crank lever constituting a handle co-operating with the first said handle whereby the said jaws may be separated, and a sleeve telescoped upon the end of the first said handle, said spring being disposed within said sleeve.

3. A holder of the character described embodying a handle, a jaw at one end of the handle, a lever mounted intermediate its ends upon said handle for pivotal movement only with respect thereto, a jaw carried by one end of said lever and co-operating with the first said jaw, a second lever connected by one end to said handle and for pivotal movement only with respect thereto a portion of said second lever being shaped to form a handle co-operating with the first said handle whereby said jaws may be separated, the free end of the first said lever being pivotally connected to the second said lever intermediate the ends of the latter, and means tending normally to move said jaws towards each other.

4. A holder of the character described embodying a handle, a jaw at one end of the handle, a lever pivotally mounted intermediate its ends upon said handle, a jaw carried by one end of said lever and co-operating with the first said jaw, a second lever pivotally connected by one end to said handle, a portion of said second lever being shaped to form a handle co-operating with the first said handle whereby said jaws may be separated, the free end of the first said lever being pivotally connected to the second said lever intermediate the ends of the latter, a casing sleeved upon one end of the first recited handle, an extension on said second lever projecting into said casing, and a spring within said casing operating upon said projection and tending normally to move said jaws toward each other.

5. A tool of the character described embodying a handle, a jaw pivotally connected to the handle for movement therewith and with respect thereto on axes transverse to each other, a lever pivotally connected intermediate its end to said handle, a jaw connected to the lever for movement therewith and with respect thereto on transverse axes, and co-operating with the first said jaw, a bell crank lever pivotally connected by one end to said handle, the free end of the first said lever being pivotally connected to said bell crank lever intermediate the ends of the latter, a shoulder on said bell crank lever, and a spring also supported by said handle and engaging said shoulder and tending normally to move the jaws toward each other, the free end of the said bell crank lever being shaped to form a handle co-operating with the first said handle.

6. A tool of the character described embodying co-operating jaws pivotally connected together, a handle connected to one of the jaws, a lever connected to the other jaw, a bell crank lever between said handle and the first said lever and to which bell crank lever one end of the first said lever is pivotally connected intermediate the ends of the latter, one end of said bell crank lever being pivotally anchored to the said handle, and spring means between the said handle and said bell crank lever tending normally to swing the bell crank lever about its pivot to move the jaws together, the free end of the bell crank lever constituting a handle for one of said jaws.

CHARLES J. KOTCHI.
JOSEPH PONDELICK.